(12) United States Patent
Johnston

(10) Patent No.: US 9,377,990 B2
(45) Date of Patent: Jun. 28, 2016

(54) IMAGE EDITED AUDIO DATA

(75) Inventor: David E. Johnston, Duvall, WA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 2565 days.

(21) Appl. No.: 12/020,308

(22) Filed: Jan. 25, 2008

(65) Prior Publication Data

US 2015/0205570 A1      Jul. 23, 2015

Related U.S. Application Data

(60) Provisional application No. 60/967,830, filed on Sep. 6, 2007.

(51) Int. Cl.
| | |
|---|---|
| *G06F 3/14* | (2006.01) |
| *G06F 3/16* | (2006.01) |
| *G10L 21/14* | (2013.01) |
| *G06F 3/0484* | (2013.01) |
| *G10L 21/10* | (2013.01) |

(52) U.S. Cl.
CPC ............ *G06F 3/165* (2013.01); *G06F 3/04842* (2013.01); *G06F 3/04845* (2013.01); *G10L 21/10* (2013.01); *G10L 21/14* (2013.01)

(58) Field of Classification Search
CPC ..................................... G06F 3/14; G06F 3/17
USPC .................... 715/200–277, 700–867; 700/94, 700/701–866; 709/201–229; 705/50–79; 345/30–111, 156, 629; 386/46–131, 386/231; 707/1–10, 100–104.1, 200–106; 600/453; 381/94.4; 455/3.02
See application file for complete search history.

(56) References Cited

U.S. PATENT DOCUMENTS

| | | | | |
|---|---|---|---|---|
| 5,999,173 | A * | 12/1999 | Ubillos | 715/724 |
| 6,204,840 | B1 * | 3/2001 | Petelycky et al. | 715/202 |
| 6,510,278 | B1 * | 1/2003 | Takayama | 386/231 |
| 6,571,255 | B1 * | 5/2003 | Gonsalves et al. | |
| 6,954,894 | B1 * | 10/2005 | Balnaves et al. | 715/202 |
| 7,318,198 | B2 * | 1/2008 | Sakayori et al. | 715/729 |
| 7,432,940 | B2 * | 10/2008 | Brook et al. | 345/629 |
| 8,121,534 | B2 * | 2/2012 | Mantel et al. | 455/3.02 |
| 2005/0275626 | A1 * | 12/2005 | Mueller et al. | 345/156 |
| 2007/0071413 | A1 * | 3/2007 | Takahashi et al. | 386/96 |
| 2009/0012398 | A1 * | 1/2009 | Zhang et al. | 600/453 |
| 2010/0204811 | A1 * | 8/2010 | Transeau | 700/94 |
| 2011/0235823 | A1 * | 9/2011 | Betts | 381/94.4 |

\* cited by examiner

*Primary Examiner* — Ruay Ho
(74) *Attorney, Agent, or Firm* — Shook Hardy & Bacon L.L.P.

(57) ABSTRACT

This specification describes technologies relating to editing digital audio data. In some implementations, a computer-implemented method is provided. The method includes displaying a visual representation of audio data, receiving an image, positioning the image as overlapping a portion of the displayed visual representation of the audio data, and editing the audio data corresponding to the portion of the displayed visual representation of the audio data overlapped by the image to form edited audio data, the editing including applying a variable editing effect according to the image content. In other implementations a computer-implemented method is provided that includes receiving an image, converting the image into a display of a visual representation of audio data using a specified conversion mode, and storing audio data corresponding to the display of audio data.

45 Claims, 16 Drawing Sheets

IMAGE EDITED AUDIO DATA

CROSS-REFERENCE TO RELATED APPLICATIONS

This application claims the benefit under 35 U.S.C. §119 (e) of Provisional U.S. Patent Application Ser. No. 60/967,830, filed on Sep. 6, 2007, which is incorporated here by reference.

BACKGROUND

This specification relates to editing digital audio data.

Different visual representations of audio data are commonly used to display different features of the audio data. For example, an amplitude display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis).

The audio data can be edited. For example, the audio data may include noise or other unwanted audio data. Removing unwanted audio data improves audio quality (e.g., the removal of noise components provides a clearer audio signal). Alternatively, a user may apply different processing operations to portions of the audio data to generate particular audio effects.

SUMMARY

This specification describes technologies relating to editing digital audio data.

In general, in one aspect, a computer-implemented method is provided. The method includes displaying a visual representation of audio data, receiving an image, positioning the image as overlapping a portion of the displayed visual representation of the audio data, and editing the audio data corresponding to the portion of the displayed visual representation of the audio data overlapped by the image to form edited audio data, the editing including applying a variable editing effect according to the image content. Other embodiments of this aspect include apparatus, systems, and computer program products.

Implementations of the aspect can include one or more of the following features. Applying the variable editing effect can include identifying a plurality of colors associated with the image and assigning a magnitude of the editing effect to apply to each identified color. The colors can be grayscale colors and the assigned magnitude can be determined using grayscale color values from white to black. The editing effect can be an attenuation effect. Editing the audio data can include isolating a portion of the audio data corresponding to the portion of the displayed audio data overlapped by the image. The aspect can further include replacing the portion of the audio data overlapped by the image with edited audio data.

The visual representation can be a frequency spectrogram and the aspect can further include dividing the image into a grid including a plurality grid boxes with respect to specified time intervals and frequency bands and determining a color value for each grid box. Applying a variable editing effect according to the image content can include determining a minimum and maximum amount of the editing effect to apply to the audio data and determining an amount of the editing effect to apply to a particular point of audio data as a function of the minimum and maximum amounts and the color value associated with the particular point of audio data. The aspect can further include storing the edited audio data.

In general, in another aspect, a computer-implemented method is provided. The method includes receiving an image, converting the image into a display of a visual representation of audio data using a specified conversion mode, and storing audio data corresponding to the display of audio data. Other embodiments of this aspect include apparatus, systems, and computer program products.

Implementations of the aspect can include one or more of the following features. The aspect can further include receiving digital audio data, displaying a visual representation of the digital audio data, and positioning the received image relative to the visual representation of the audio data. Converting the image can include associating image content with particular frequencies. The particular frequencies can include a specified number of pure tones or random noise tones that fluctuate over time relative to corresponding pure tones. Converting the image can also include using the image color to identify intensity values for the converted image, or tracking image content to identify frequency values.

Particular embodiments of the subject matter described in this specification can be implemented to realize one or more of the following advantages. A user can import an image to use as a mask or filter for applying a variable editing effect to audio data. For example, the user can create a precise mask using a graphics application and apply the mask to audio data to provide a finely tuned audio editing effect. Additionally, a user can convert a non-audio image into audio data. For example, user can import the image in order to hide it within other audio data. Alternatively, the user can import an image and convert the image to audio data in order to generate new audio effects.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
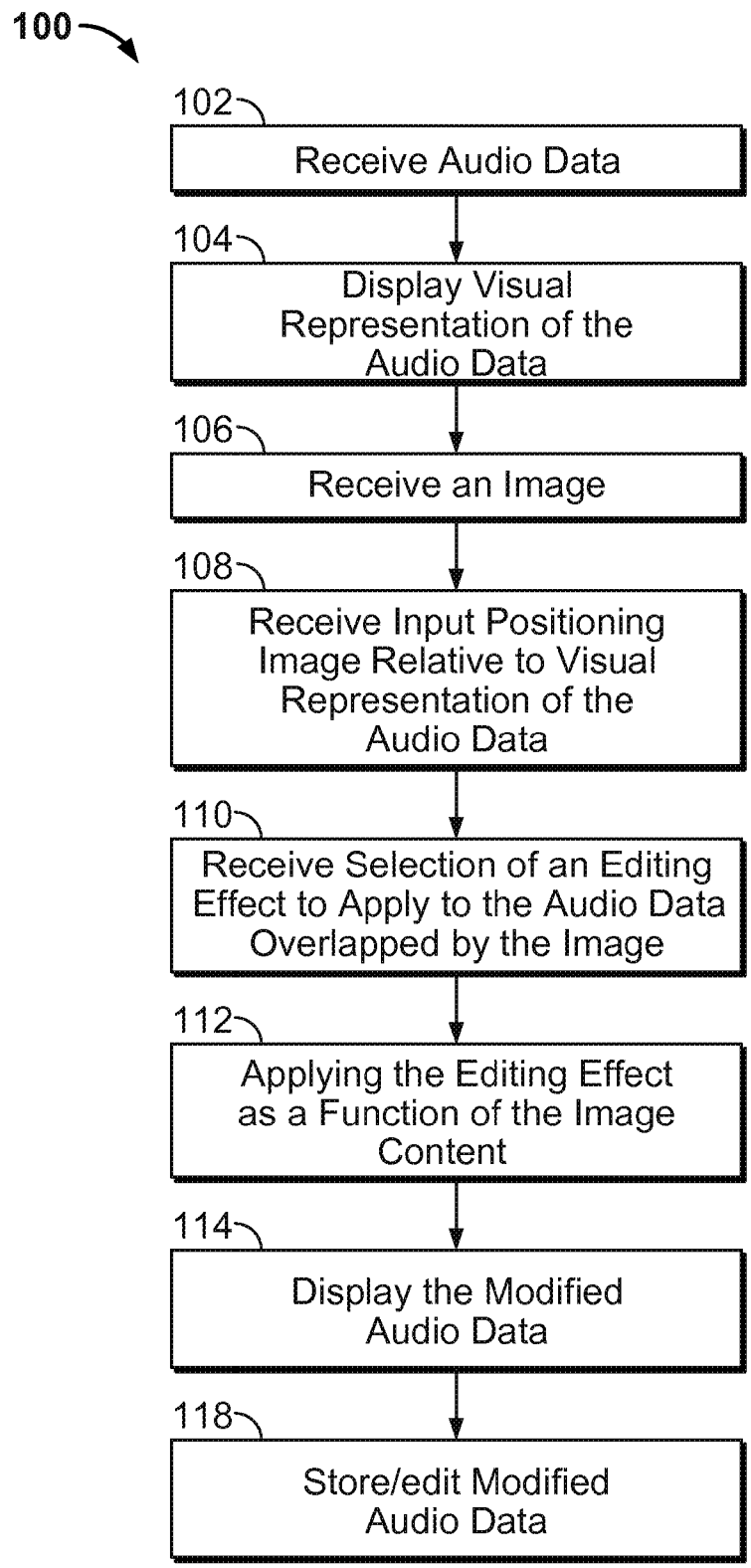
FIG. 1 is a flowchart of an example method of using an image to edit audio data.

FIG. 1 is a flowchart of an example method 100 for using an image to edit digital audio data. For convenience, the method 100 will be described with reference to a system (e.g., an audio editing system) that performs the method 100.

The system receives 102 digital audio data. The audio data is received, for example, as part of an audio file (e.g., a WAV, MP3, or other audio file). The audio file can be locally stored or retrieved from a remote location. The audio data can be received, for example, in response to a user selection of a particular audio file.

The system displays 104 a visual representation of the audio data. For example, a particular feature of the audio data can be plotted and displayed in a window of a graphical user interface. The visual representation can be selected to show a number of different features of the audio data. In some implementations, the visual representation displays a feature of the audio data (e.g., frequency, amplitude, pan position) on a feature axis and time on a time axis. For example, visual representations can include a frequency spectrogram, an amplitude waveform, a pan position display, or a phase display.

In some implementations, the visual representation is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations, e.g., as a third dimension to the displayed audio data. In some alternative implementations, the color or brightness can be used to indicate another feature of the audio data e.g., pan position.

In other implementations, the visual representation is a pan position display. The pan position display shows audio pan position (i.e., left and right spatial position) in the time-domain (e.g., a graphical display with time on the x-axis and pan position on the y-axis). Additionally, the pan position display can indicate another audio feature (e.g., using color or brightness) including intensity and frequency.

Figure 2:
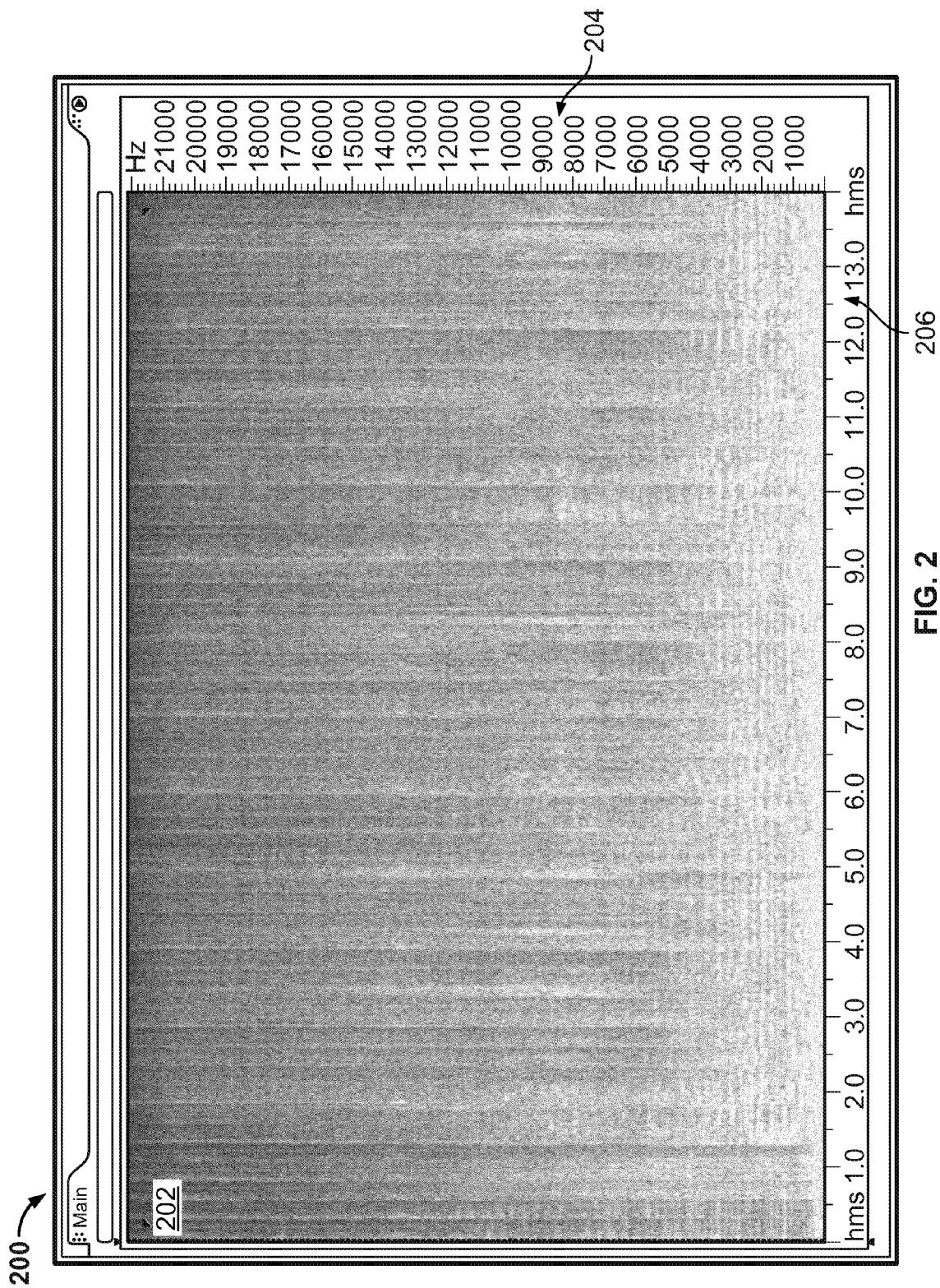
FIG. 2 is an example display of a visual representation of audio data as a frequency spectrogram.

FIG. 2 is an example display 200 of a visual representation of audio data as a frequency spectrogram 202. The display 200 shows frequency (in hertz) on the y-axis 204 and time (in seconds) and the x-axis 206. The frequency spectrogram 202 shows spectral lines indicating the frequency of audio data with respect to time. Thus, a particular point in the frequency spectrogram 202 corresponds to a particular frequency and time as indicated, e.g., by x and y coordinates in the display. In some implementations, not shown, the spectral lines of the frequency spectrogram 202 are colored or otherwise indicate (e.g., according to brightness) another audio feature (e.g., intensity of the audio data at that frequency and time).

As shown in FIG. 1, the system receives 106 an image. The image is received, for example, as part of an image file (e.g., a bitmap, JPG, or other image file). The image file can be locally stored or retrieved from a remote location. The image can be received, for example, in response to a user selection of a particular image to open or import. In some implementations, the user imports the image from another application, for example, a graphics editing application.

The system receives 108 an input positioning the image relative to the display of the visual representation of the audio data. The input can include, for example, a user input demarcating a region within the display of the visual representation of audio data. The demarcated region can be used to identify a region in which to position the image. In some implementations, the user uses a tool e.g., a rectangle tool, to demarcate the region.

The system can receive an input resizing the demarcated region, for example, using control points on the sides or corners of the demarcated region. For example, the user can enlarge or shrink one or more sides of the demarcated region by manipulating the control points. Additionally, the user can move the demarcated region to adjust the position of the demarcated region relative to the visual representation of the audio data. In some implementations, the user adjusts the size and position of the demarcated region after the image is positioned such that the image is resized or moved accordingly.

Figure 3:
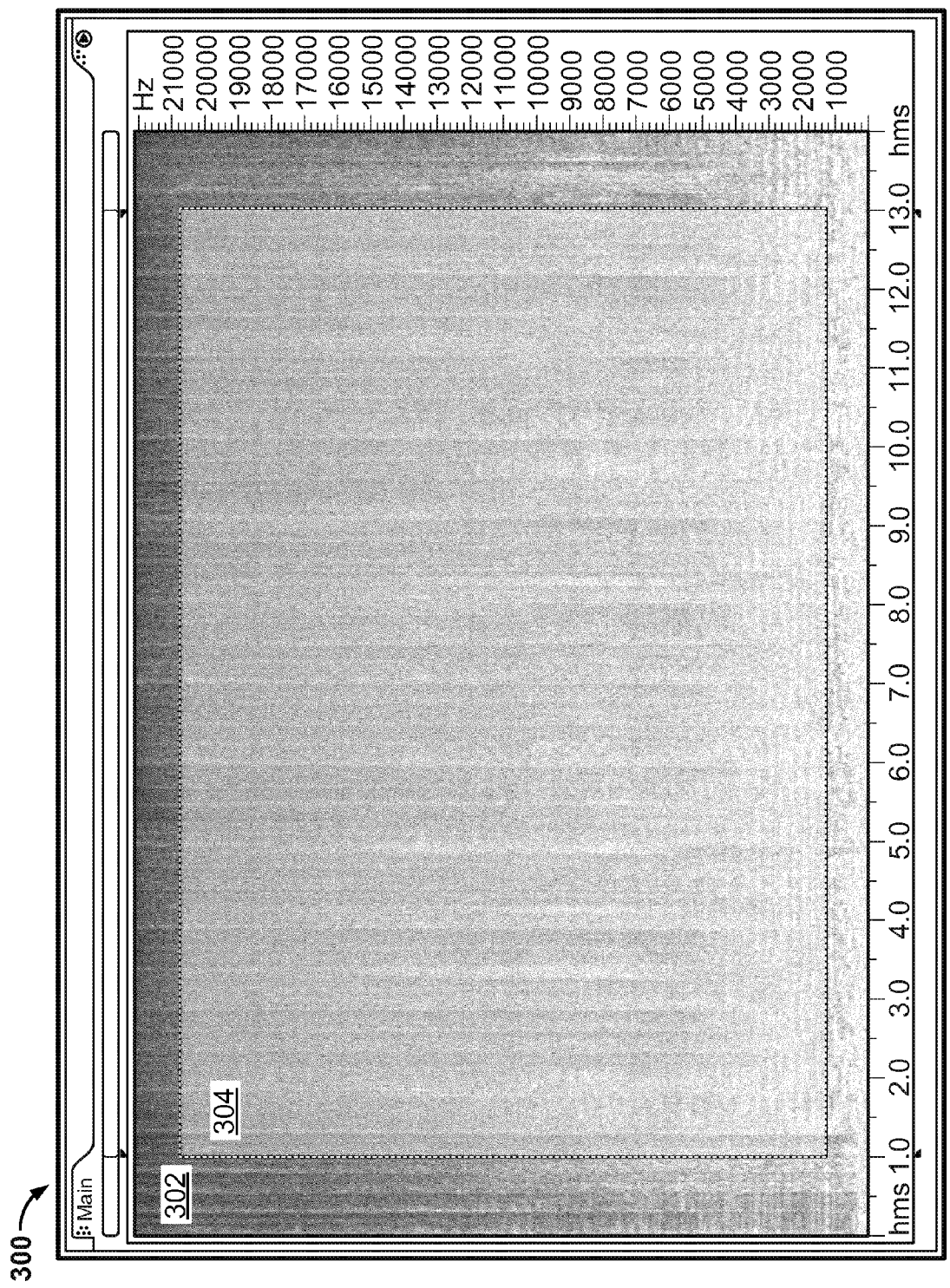
FIG. 3 is an example display of a visual representation of audio data as a frequency spectrogram including a demarcated region.

FIG. 3 is an example display 300 of audio data as the frequency spectrogram 302 including a demarcated region 304. Similarly to the frequency spectrogram 202 of FIG. 2, the frequency spectrogram 302 shows spectral lines indicating the frequency of audio data with respect to time. The demarcated region 304 can be generated, for example, according to a user input. For example, the user can use a rectangle or other geometric selection tool to define the demarcated region 304 of the frequency spectrogram 302.

Figure 4:
FIG. 4 is an example display of a visual representation of audio data including an image.

FIG. 4 is an example display 400 of audio data as a frequency spectrogram 402 including an image 404. In FIG. 4, the image 404 is positioned in the display 400 relative to the frequency spectrogram 402. In particular, the image 404 has been positioned in the demarcated region 304 of FIG. 3 such that the image 404 overlaps a central region of the frequency spectrogram 402.

As shown in FIG. 1, the system receives 110 a selection of an editing effect to apply to the audio data overlapped by the image. For example, a gain effect can be applied to amplify or attenuate the audio data using the overlapping image, e.g., as a mask. In other implementations, the overlapping image is converted into audio data for replacing the underlying audio data or to be combined with the underlying audio data. Converting the image into audio data is described in greater detail below.

The system applies 112 the selected editing effect as a function of the image content. The system applies the editing effect to the particular audio data corresponding to the region of the visual representation of audio data that is overlapped by the image. For each point of the displayed visual representation of audio data overlapped by the image (e.g., for each piece of audio data identified in the frequency spectrogram by a particular frequency and time overlapped in the display by the image) the system applies the editing effect to the audio data according to a color value of the image data corresponding to that point. For example, an attenuation is applied to all of the audio data in the selected audio data according to the determined attenuation amount for each point as a function of the corresponding image color value at that point. Alternatively, the system can use image brightness, or other distinctive features to distinguish different editing effect applications.

Figure 5:
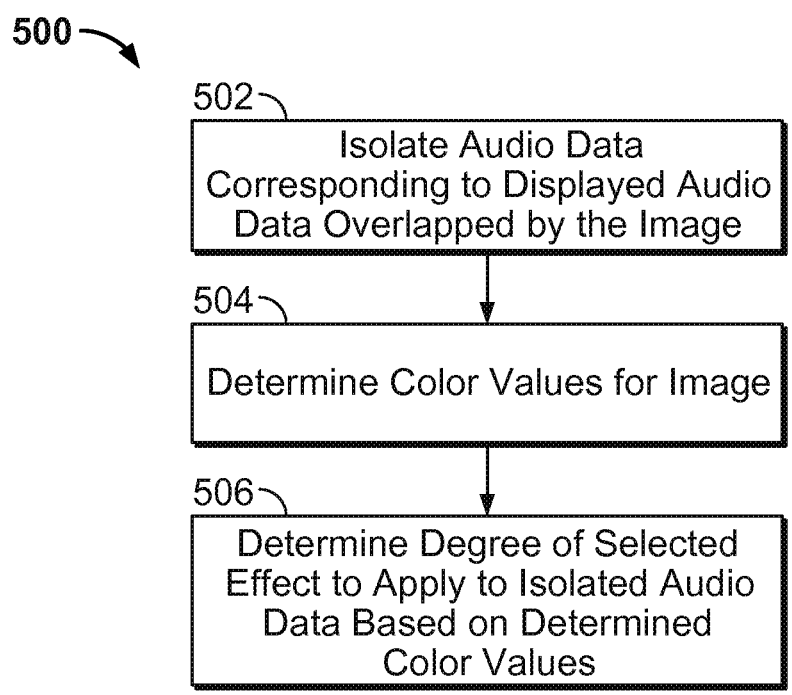
FIG. 5 is a flowchart of an example method of using an image to edit audio data.

FIG. 5 is a flowchart of an example method 500 of using an image to edit audio data. For convenience, the method 500 will be described with reference to a system that performs the method 500.

To apply a selected editing effect to the portion of audio data corresponding to a region of the visual representation that is overlapped by the image, the system isolates 502 the audio data corresponding to the overlapped region from the audio data as a whole. The selected editing effect can then be applied to the isolated audio data.

Figure 6:
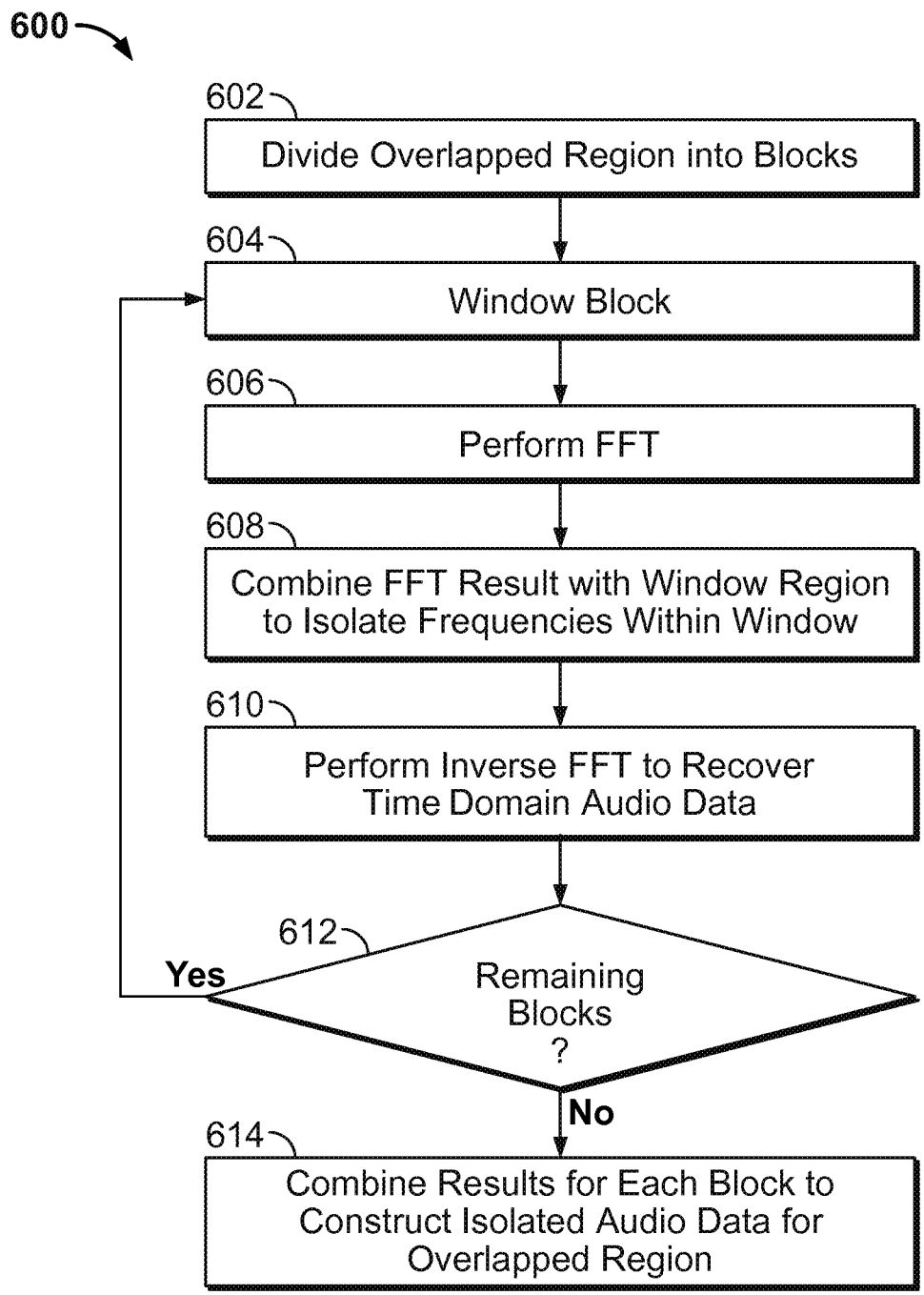
FIG. 6 is a flowchart of an example method for isolating a region audio data.

FIG. 6 is a flowchart of an example method 600 for isolating a region of audio data. For convenience, the method 600 will be described with reference to a system that performs the method 600. FIG. 6 shows an example process 600 for isolating the portion of the audio data corresponding to an overlapped region of the displayed audio data. The overlapped region is the portion of the displayed audio data overlapped by the image.

The system divides 602 the overlapped region into a series of blocks. In one implementation, the blocks are rectangular units, each having a uniform width (block width) in units as a function of time. The amount of time covered by each block is selected according to the type of block processing performed. For example, when processing the block according to a Short Time Fourier transform method, the block size is small (e.g., 10 ms). Additionally, the height of each block is designed to match the contours of the overlapped region such that each block substantially matches the frequency range of the overlapped region for the period of time coved by the block.

In one method for creating blocks, each successive block partially overlaps the previous block along the x-axis (i.e., in the time-domain). This is because the block processing using Fourier transforms typically has a greater accuracy at the center of the block and less accuracy at the edges. Thus, by overlapping blocks, the method compensates for reduced accuracy at block edges.

Each block is then processed to isolate audio data within the block. For simplicity, the block processing operations are described below for a single block as a set of serial processing steps, however, multiple blocks can be processed substantially in parallel (e.g., a particular processing operation can be performed on multiple blocks prior to the next processing operation).

The block is windowed 604. The window for a block is a particular window function defined for each block. A window function is a function that is zero valued outside of the region defined by the window (e.g., a Blackman-Harris window). Thus, by creating a window function for each block, subsequent operations on the block are limited to the region defined by the block. Therefore, the audio data within each block can isolated from the rest of the audio data using the window function.

The system performs 606 a Fast Fourier transform ("FFT") to extract the frequency components of a vertical slice of the audio data over a time corresponding to the block width. The Fourier transform separates the individual frequency components of the audio data (e.g., from zero hertz to the Nyquist frequency). The system applies 608 the window function of the block to the FFT results. Because of the window function, frequency components outside of the block are zero valued. Thus, combining the FFT results with the window function removes any frequency components of the audio data that lie outside of the defined block.

The system performs 610 an inverse FFT on the extracted frequency components for the block to reconstruct the time domain audio data solely from within the each block. However, since the frequency components external to the bock were removed by the window function, the inverse FFT generates isolated time domain audio data result that corresponds only to the audio components within the block.

The system similarly processes 612 additional blocks. Thus, a set of isolated audio component blocks are created. The system combines 614 the inverse FFT results from each block to construct isolated audio data corresponding to the portion of the audio data within the overlapped region. The results are combined by overlapping the set of isolated audio component blocks in the time-domain. As discussed above, each block partially overlaps the adjacent blocks. In one implementation, to reduce unwanted noise components at the edges of each block, the set of isolated audio component blocks are first windowed to smooth the edges of each block. The windowed blocks are then overlapped to construct the isolated audio data. The above technique of using FFT's can be used in a similar manner to isolate audio data for other types of visual representations including a pan position display or phase display of audio data.

In other implementations, the overlapped region of audio data is isolated using other techniques. For example, instead of Fourier transforms, one or more dynamic zero phase filters can be used. A dynamic filter, in contrast to a static filter, changes the frequency pass band as a function of time, and therefore can be configured to have a pass band matching the particular frequencies present in the overlapped region at each point in time. Thus, dynamic filtering can be performed to isolate the audio data of a overlapped region in a display of audio data.

As a result of the isolating, the audio data outside the overlapped region is effectively attenuated to zero, leaving only the overlapped portion of the audio data for the purposes of applying one or more editing effects.

As shown in FIG. 5, the system determines 504 color values for the image. The image can be treated as a mask image having varied color values. In some implementations, the mask image is divided into a grid as a function of the corresponding feature and time values of the audio data. Thus, if the overlapping region of the displayed representation of the audio data is from a frequency spectrogram, the grid divides the image according to frequency and time. For example, time within the image can be divided into frames having a specified width corresponding to a number of samples (e.g., 256 samples per frame). The frequencies within the image can be divided into bins each having a specified frequency range (e.g., a bin can have a frequency range from 1,000 Hz to 1,044 Hz). The bins and frames are used to generate a grid within the image corresponding to the overlapping region of the displayed audio data.

The color of the image is identified for each grid box. The color can be a grayscale color value along a gradient from black to white. In some implementations, the color is given a color value from 0 to 255 where zero is black and 255 is white and where the values between 0 and 255 reflect the varied amounts of color. In some implementations, the color value for each grid box is determined as an average color of the portion of the image within the grid box.

Alternatively in some implementations, the color at each point in the image is used (e.g., a color value for each pixel) without generating a grid. In other implementations, a gamma value is used to improve contrast the shades of color between black and white (e.g., to provide greater contrast in lighter or darker portions of the image mask).

In other alternative implementations, the image color is non-grayscale (e.g., RGB color model having color values tuples). Additionally, in some implementations, brightness is used in a similar manner to identify a range of values for applying an editing effect.

The system determines 506 the degree of the selected effect to apply to each point of audio data based on the determined color at each point in the image. The system can determine the amount, or intensity, of the editing effect for each point in the overlapping region using the corresponding image color at that point. For example, the effect can be a multiple from 0 to 1.0 where a multiple of zero is applied where the color is black and a multiple of 1.0 is applied (e.g., full effect) for a maximum color (e.g., color value of 255 grayscale). The multiple applied can be linear across color values from black to white. Alternatively, the multiple applied can be non-linear, e.g., logarithmic.

In some implementations, an average color for each grid box is used. Thus, for audio data corresponding to points in a particular grid box, the editing effect is applied to the audio data as a function of the color value for that grid box.

If the audio effect is an attenuation effect (i.e., a gain decrease), the amount of attenuation applied to the audio data varies depending on the color in the image corresponding to that particular point of audio data (e.g., in frequency/time space). For example, a maximum attenuation amount can be applied to audio data where the color is white and a minimum attenuation amount can be applied to audio data where the color is black. Thus, each point of audio data within the selected audio data (e.g., a particular frequency and time, for example, t=1.2 seconds, f=1,000 Hz) is mapped to the corresponding color value in the image. In some implementations, the corresponding color value is the average color value for the corresponding grid box containing that mapped point. The system uses the color value to determine the amount of attenuation to apply to the audio data corresponding to that point. For example, the system can apply a particular multiple according to the color value. Thus, if the maximum attenuation is 120 dB for white and 0 dB for black and the multiple based on color is 0.5 at a particular point (e.g., where the color is midway between black and white), then the attenuation to be applied at that point is equal to 60 dB.

When gamma is used to accentuate the color values, the system determines the attenuation according to a gamma modified color value, for example as:

$$\text{Attenuation} = \text{Black(dB)} + \text{pow}\left(\frac{\text{color}}{255}, \text{gamma}\right)(\text{White(dB)} - \text{Black(dB)})$$

Where, for example, the value of Black(dB) is the minimum amount of attenuation applied and White(dB) is the maximum amount of attenuation applied. For example, the attenuation for Black(dB) can be 0 dB attenuation. Similarly, the attenuation for White(dB) can be 120 dB maximum attenuation. The "pow" represents a power function where the first parameter is raised to the power of the second parameter. Thus, power (color/255, gamma) is equivalent to raising (color/255) to the "gamma" power. The value of pow(color/255, gamma) is used to identify the multiple applied to the attenuation. For example, without using gamma, a color of 255 results in a multiple of 1.0. Thus, for the example maximum and minimum attenuation given above, the attenuation would be 120 dB.

As shown in FIG. 1, the system displays 114 the modified audio data. The display of the audio data, for example as a frequency spectrogram, can be updated to reflect the changes in the audio data as a result of the applied editing effect. In some implementations, the system automatically updates the displayed audio data following application of an editing effect that changes the audio data. Alternatively, in some implementations, the user initiates an updated display. For example, the user can make a particular selection within the interface associated with the displayed audio data.

The system stores or further processes 116 the audio data. For example, the system can store the modified audio data as a separate audio file. Additionally or alternatively, the user can apply other editing effects to the modified audio data, play the audio data, transmit the audio data, or otherwise process the audio data.

Figure 7:
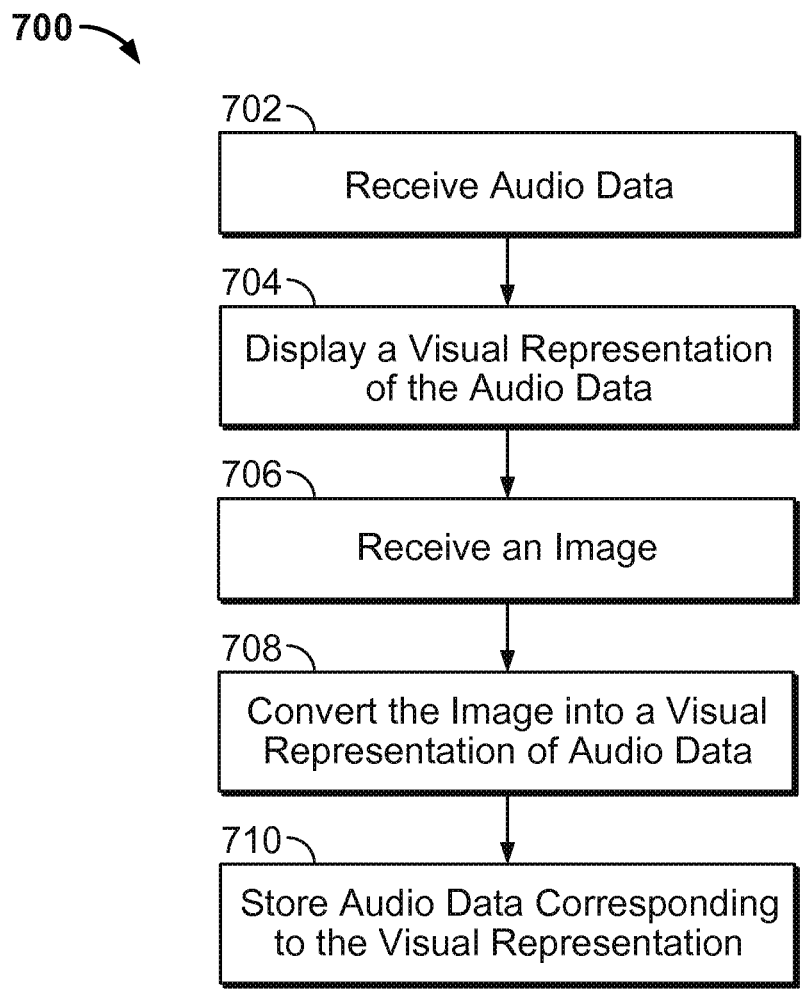
FIG. 7 is a flowchart of an example method for generating audio data using image content.

FIG. 7 is a flowchart of an example method 700 for generating audio data using image content. For convenience, the method 700 will be described with reference to a system that performs the method 700.

The system receives 702 digital audio data. The audio data is received, for example, as part of an audio file (e.g., a WAV, MP3, or other audio file). The audio file can be locally stored or retrieved from a remote location. The audio data can be received, for example, in response to a user selection of a particular audio file.

The system displays 704 a visual representation of the audio data. For example, the system can plot and display a particular feature of the audio data in a window of a graphical user interface. The visual representation can be selected to show a number of different features of the audio data. In some implementations, the visual representation displays a feature of the audio data on a feature axis and time on a time axis.

In some implementations, the visual representation is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations in the displayed audio data. In some alternative implementations, the color or brightness is used to indicate another feature of the audio data e.g., pan position.

The system receives 706 an image. The image is received, for example, as part of an image file (e.g., a bitmap, JPG, or other image file). The image file can be locally stored or retrieved from a remote location. The image can be received, for example, in response to a user selection of a particular image to open or import (e.g., to the audio editing system). In some implementations, the user imports the image from another application, for example, a graphics editing application. In some implementations, the user demarcates a region for positioning the received image as described above with respect to FIG. 1. Additionally, in some implementations, the user moves the image after initially positioning the image (e.g., repositioning the image relative to the displayed audio data).

In some alternative implementation, the system receives the image without receiving initial audio data. Consequently, the system does not display audio data prior to receiving the image. Instead, the image is directly displayed without other audio data presented.

The system converts 708 the image into a visual representation of audio data. After converting the image into a visual representation of audio data, the system can store 710 audio data corresponding to the visual representation of the audio data including the converted image. For example, the system can store the modified audio data as a separate audio file. Additionally or alternatively, the user can apply other editing effects to the audio data.

In some implementations, the user selects a particular conversion mode to apply to the image. Alternatively, the system can apply a default conversion mode. Each conversion mode identifies audio parameters specifying a range of values for the converted audio data, for example, minimum and maximum frequency boundaries and time boundaries. In some implementations, the user uses an import image dialog to specify audio parameters including frequency and time ranges. Additionally, the system can use the colors of the image to identify and provide values for another feature of the audio data. For example, if the image is being converted into a frequency spectrogram, the user can specify a frequency range (e.g., from 1000 Hz to 20,000 Hz), a time range (e.g., defining the width of the image to cover a time of 10 seconds), and an intensity range as a function of image color. For example, white can correspond to a maximum intensity of −10 dB and black can correspond to a minimum intensity of −120 dB. The system can then define values for intermediate colors (e.g., real colors or grayscale) between the maximum and minimum intensity values. Alternatively, a brightness of the image can be used to identify an intensity value where higher brightness results in higher intensity.

In some other implementations, the image size, when positioned as overlapping existing audio data, defines the audio parameters. For example, if the image is positioned such that the image width and height falls between particular ranges of time and frequency, the converted audio data will correspond to those ranges.

In one conversion mode, the image is divided into multiple pure tones. Each pure tone is referred to as an oscillator. The number of oscillators can be user specified. The pure tones correspond to horizontal frequency bars at regular intervals, e.g., every 200 Hz. The image content corresponding to the horizontal locations of each pure tone is associated with that frequency value. In some implementations, the intervals are smaller, e.g., every 40 Hz, or larger, e.g., every 500 Hz. However, larger intervals can result in more perceptively discontinuous audio data. In an alternative implementation, for a frequency spectrogram using a logarithmic frequency scale, the pure tone interval is based on notes. For example, the interval can be one note, resulting in a frequency spacing between tones of one octave.

Additionally, the system uses the colors (or alternatively brightness) of the image to associate intensity values with the converted audio data. For example, for the audio data synthesized across each pure tone, the corresponding color of the image for a particular frequency and time position is used to assign an intensity value for that point.

Figure 8:
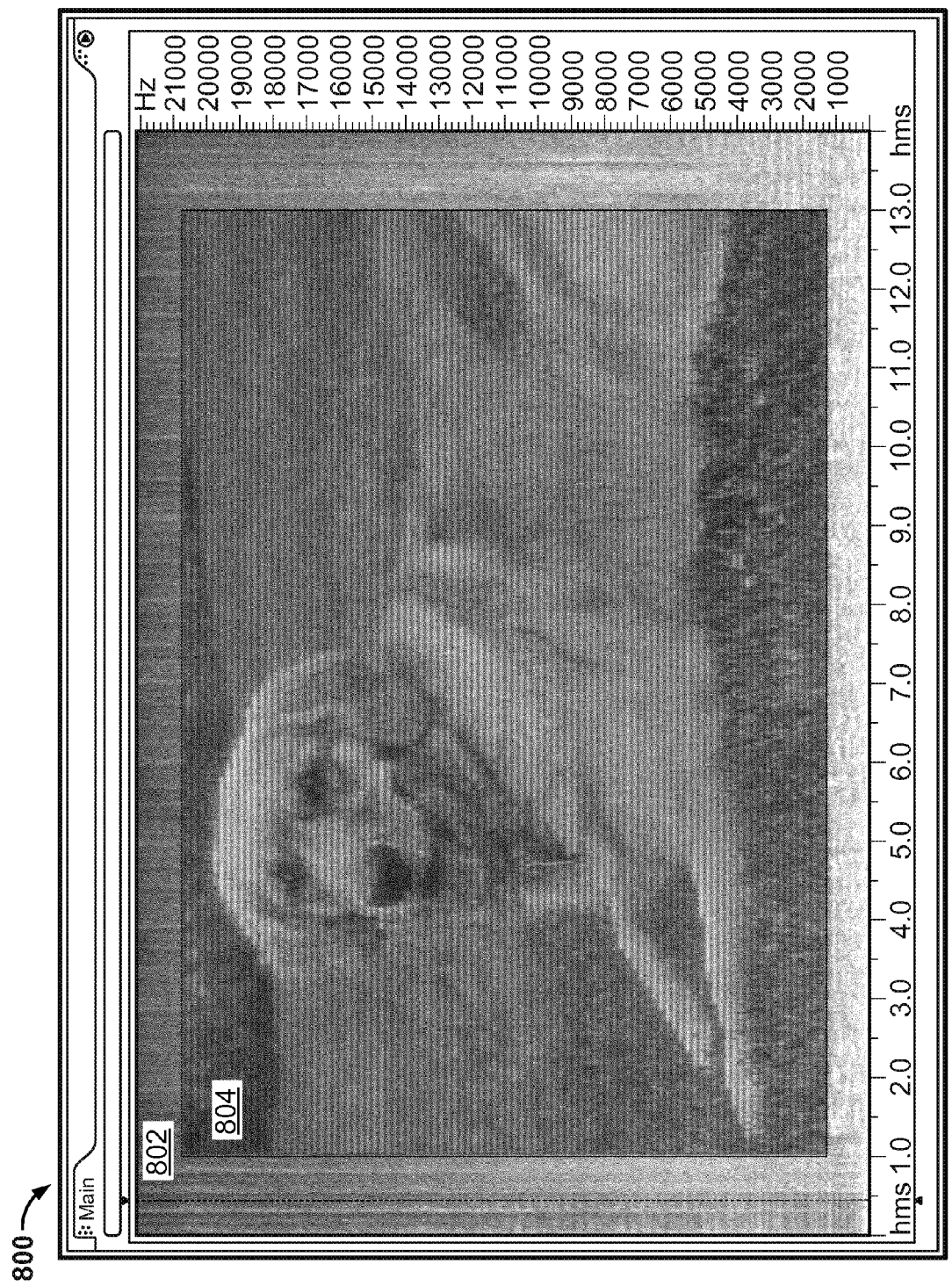
FIG. 8 is an example display of a visual representation of audio data generated from image content using pure tones.

FIG. 8 is an example display 800 of a visual representation of audio data generated from image content using pure tones. The display 800 includes a frequency spectrogram representation of underlying audio data 802 as well as a converted image 804. The converted image 804 is generated using pure tones, as shown by the horizontal bars across the image 804. Additionally, the color or brightness of the image can be used to associate intensity values with the converted audio data. The audio data of the converted image 804 replaced any underlying audio data 802 where the converted image 804 is positioned.

A second conversion mode uses variable frequency tones. Referred to as a random noise conversion mode, the second conversion mode is similar to the pure tone conversion mode and also has a specified tone spacing interval (e.g., every 200 Hz). However, in random noise conversion mode, the frequency associated with the image data can vary from the corresponding pure tone. For example, if a pure tone is set at 400 Hz, the random noise tone fluctuates over time either according to a pattern or unpredictably within a specified range plus or minus of the pure tone (e.g., +/−50 Hz from a 400 Hz pure tone). The random noise conversion mode can provide a smoother audio data result as compared with the pure tone conversion mode. As with the first conversion mode, intensity values can be associated with the converted audio data according to the color or brightness of each respective point in the image.

Figure 9:
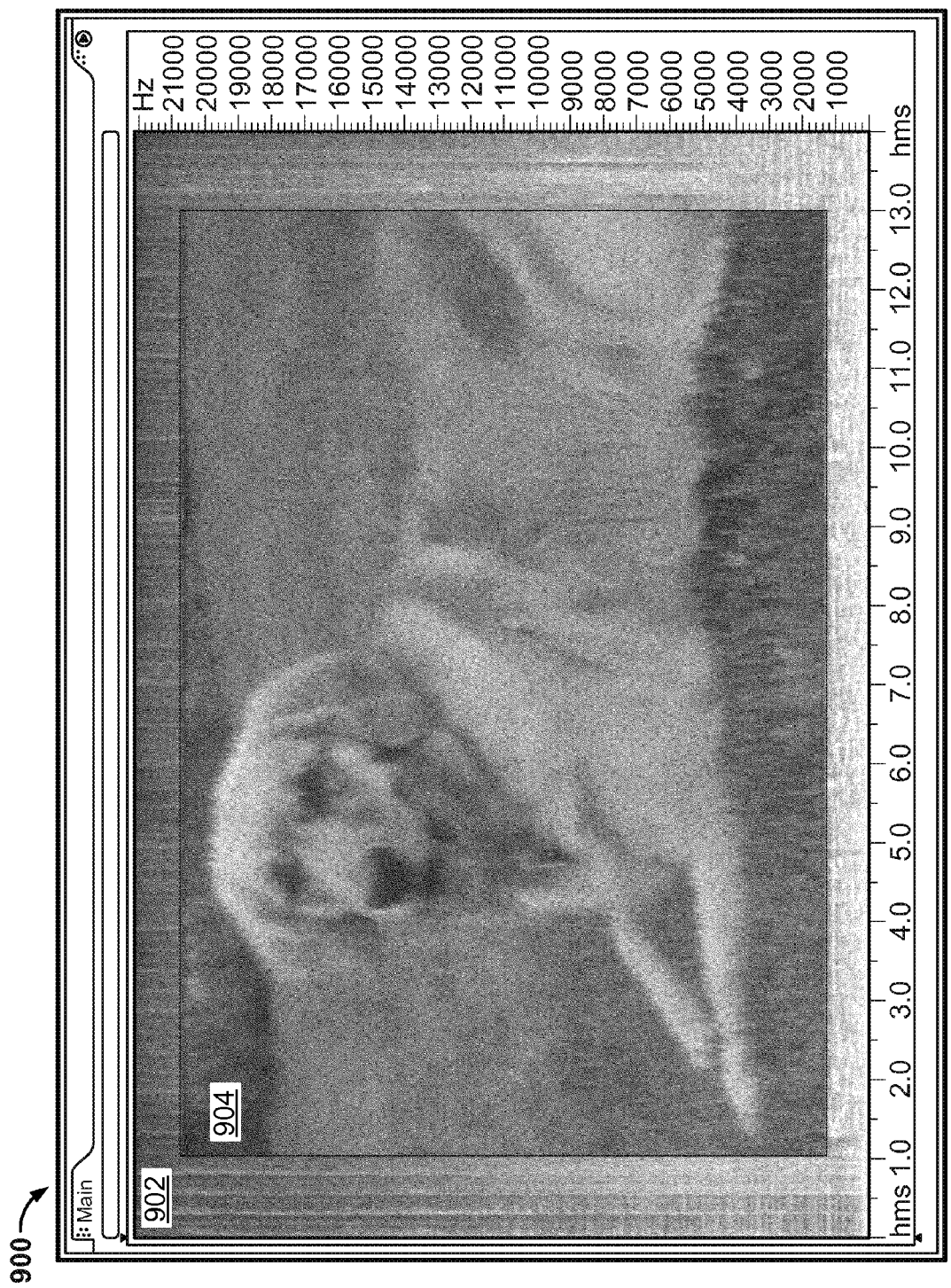
FIG. 9 is an example display of a visual representation of audio data generated from image content using random noise.

FIG. 9 is an example display 900 of a visual representation of audio data generated from image content using the random noise conversion mode. The display 900 includes a frequency spectrogram representation of underlying audio data 902 as well as a converted image 904. The converted image 904 is generated using the random noise conversion mode. Because of the frequency fluctuations, the converted image 904 does not have the horizontal lines of the converted image 804 of FIG. 8, but instead has a smoother appearance. Additionally, the resulting audio playback can be perceived as smoother and with less buzzing or other audio defects compared with a conversion using pure tones.

A third conversion mode tracks the associated frequencies according to the image content. Referred to as a tracking conversion mode, the third conversion mode is again similar to the pure tone conversion mode in that frequency spacing intervals are specified (e.g., every 200 Hz). However, for a particular tone (e.g., at one of the frequency intervals), the system identifies image content according to relative brightness (or color) and varies the frequency up or down to track the brighter portions (or lighter color portions) of the image content.

For example, if a tone is at 400 Hz, as the system associates audio data along a horizontal line at 400 Hz, if brighter image content is identified within a specified distance from 400 Hz (e.g., a distance corresponding to +/−100 Hz or, alternative, within ½ octave) the brighter audio data is associated with a corresponding frequency (e.g., according to the scale in the audio data display). For example, image content at a given point in time can be associated with 470 Hz based on brightness instead of the 400 Hz tone value. Thus, the system tracks the brighter portions of the image content when converting the image to audio data. Since brighter (or lighter) areas are also associated with greater intensity values, the associated frequencies can track the image content having the greatest intensity.

Figure 10:
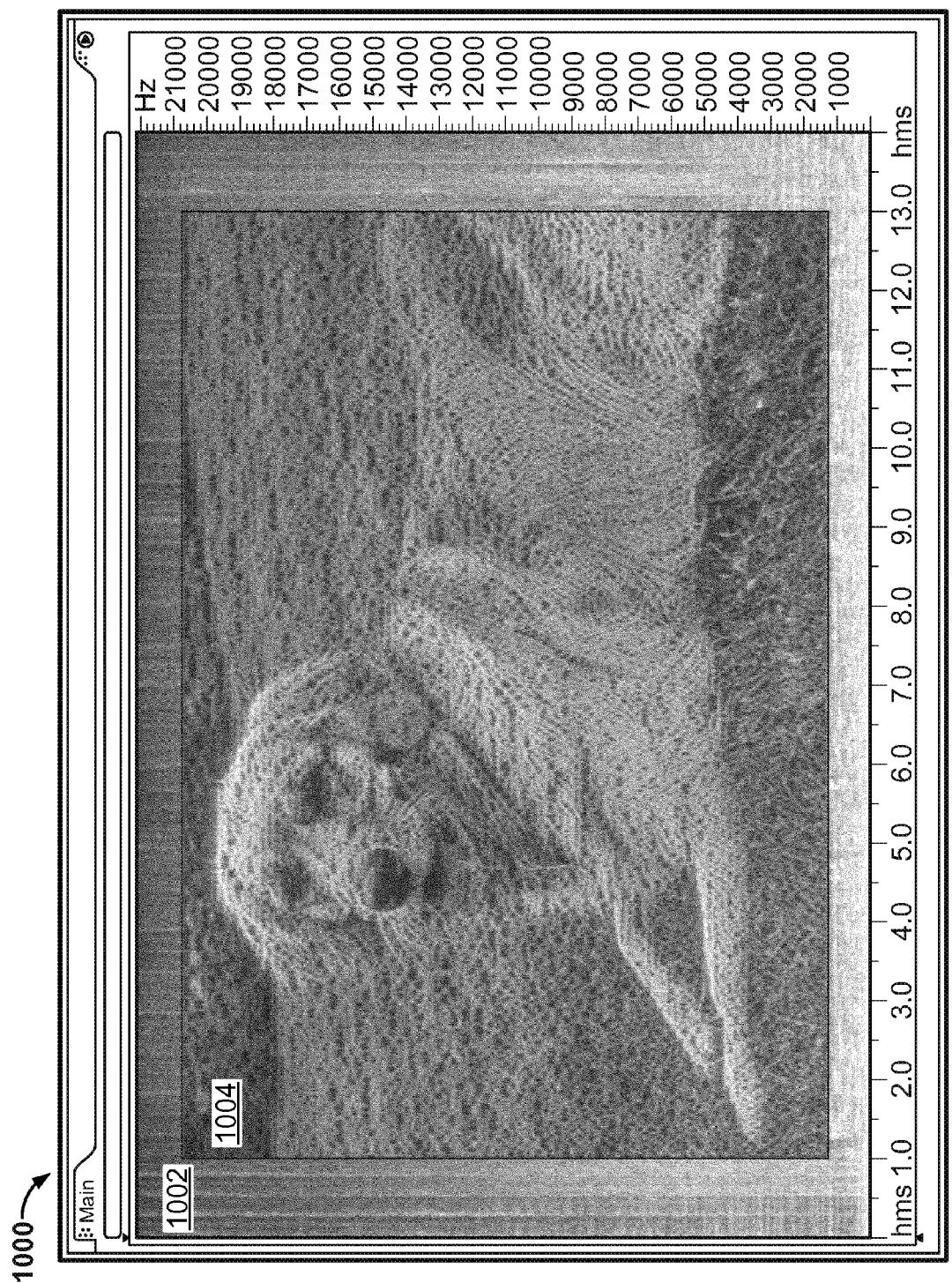
FIG. 10 is an example display of a visual representation of audio data generated from image content using image tracking.

FIG. 10 is an example display 1000 of a visual representation of audio data generated from image content using image tracking. The display 1000 includes a frequency spectrogram representation of underlying audio data 1002 as well as a converted image 1004. The converted image 1004 is generated using the tracking conversion mode. The converted image 1004 includes spectral lines that more closely track contours of the image. Additionally, the audio data generated using image tracking can have a perceptively distinct sound compared to the other technique for generating audio data from image content.

In alternative implementations, the image content can be converted into other visual representations of audio data, for example, a pan position display or phase display (e.g., where the position of image content defines a particular pan location and the color of the image is used to associate intensity values at those pan positions).

The examples shown in FIGS. 8-10 illustrate examples where the imported image replaces any underlying audio data. However, in other implementations, the image is converted into audio data that is combined with any existing audio data overlapped by the image.

Figure 11:
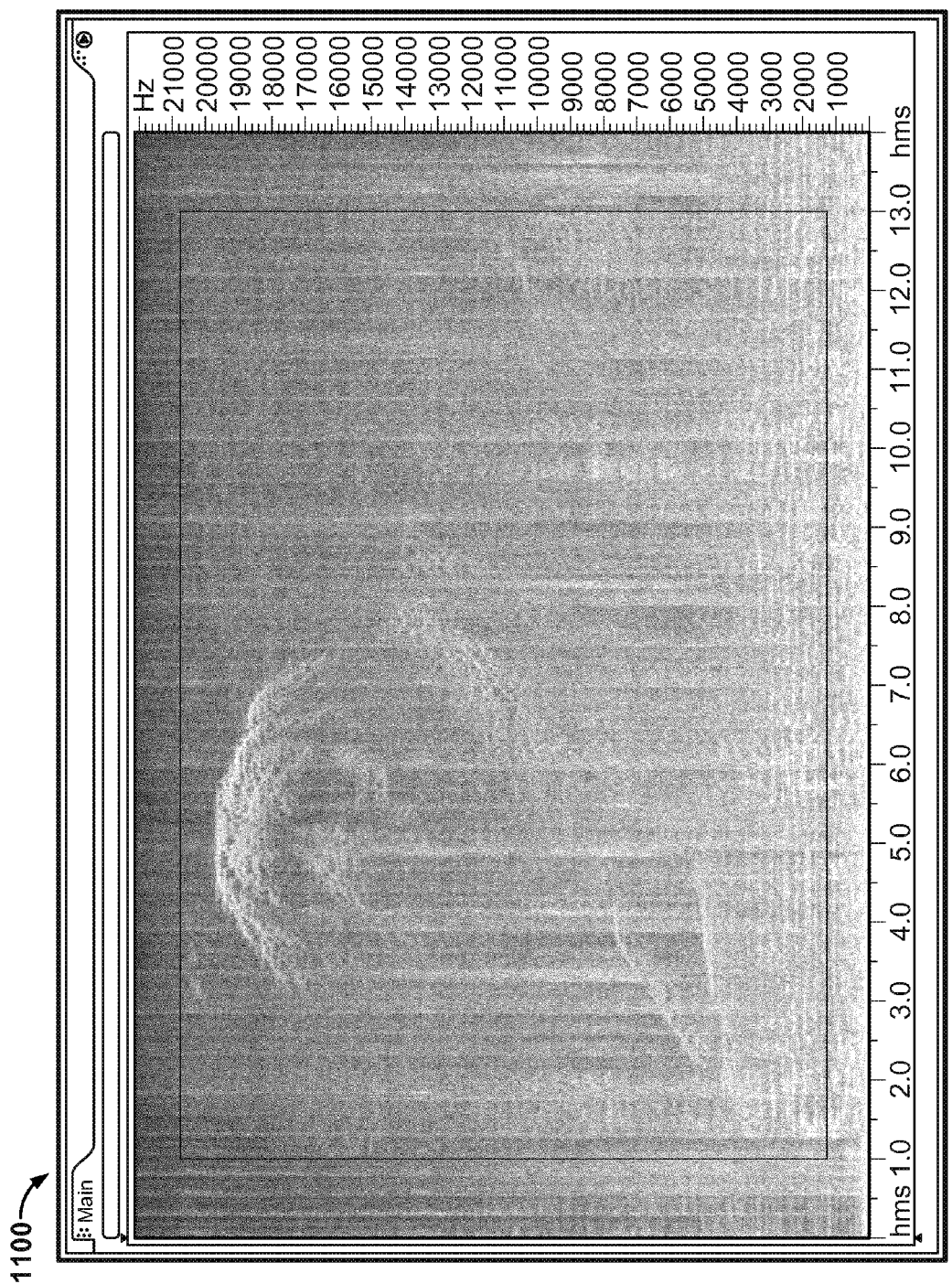
FIG. 11 is an example display of a visual representation of audio data where image generated audio data overlaps existing audio data.

FIG. 11 is an example display 1100 of a visual representation of audio data 1102 where image generated audio data overlaps existing audio data. As shown in FIG. 11, the region of the audio data overlapped by an imported image has been blended to included audio data both from the image and the underlying audio data.

In some implementations, the system imports the image directly without first displaying audio data. For example, the user can import the image directly in an audio editing system without receiving audio data.

Figure 12:
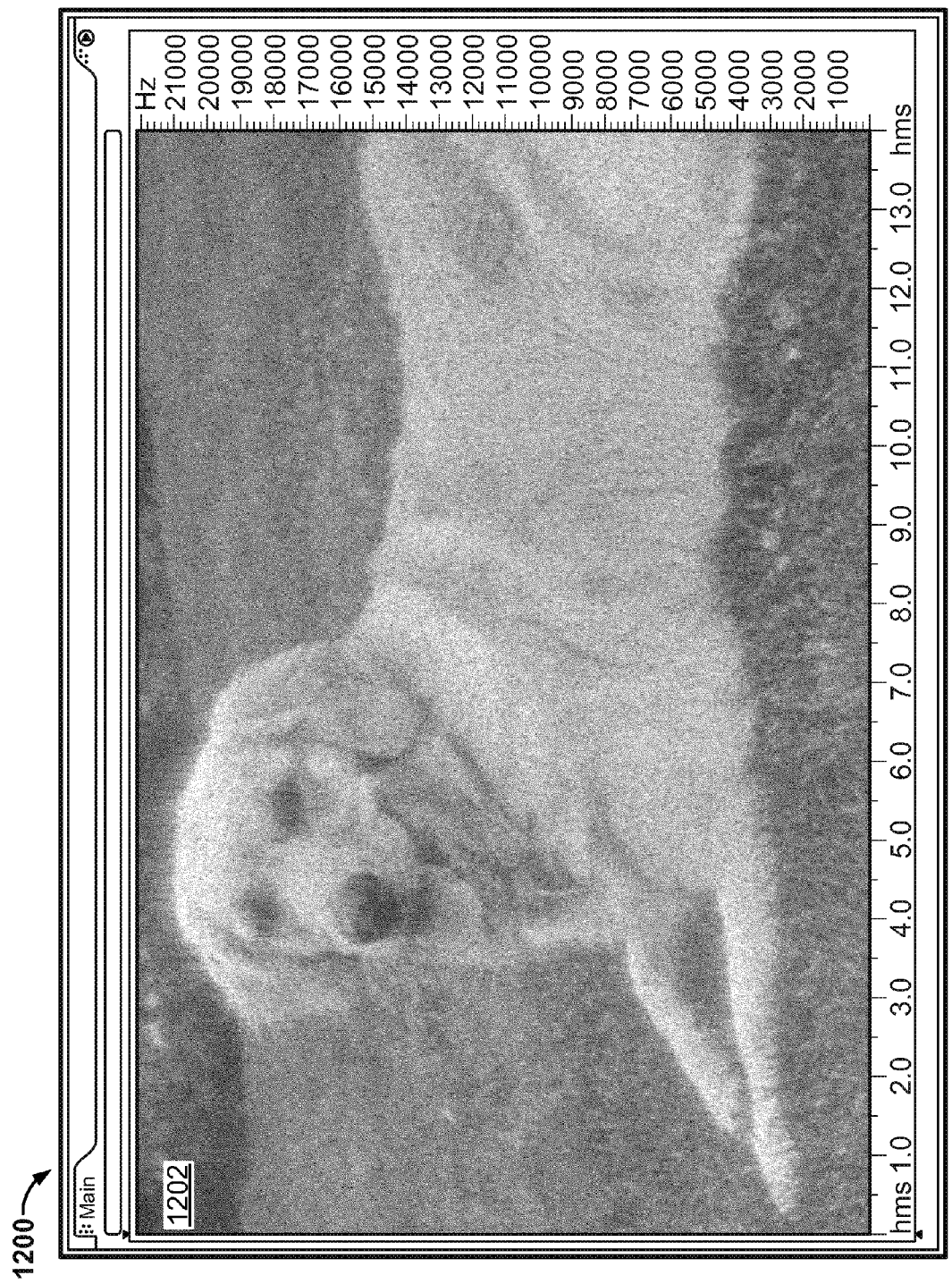
FIG. 12 is an example display of a visual representation of audio data using only image content.

FIG. 12 is an example display 1200 of a visual representation of audio data 1202 using only image content (e.g., no underlying representation of audio data is displayed prior to importing the image). The visual representation of audio data 1202 is generated using only the image content without replacing or overlapping any existing display of audio data.

In some implementations, the user demarcates an arbitrary region of a visual representation of audio data and then positions an image or a portion of the image within the arbitrary region. For example, the user can use a brush, lasso, or other tool to demarcate an arbitrary region. The user can then import an image file (e.g., a bitmap) which is copied within the arbitrary region. The image can be constrained by the boundaries of the arbitrary region (e.g., the image is cropped or resized to fit the arbitrary region).

Figure 13:
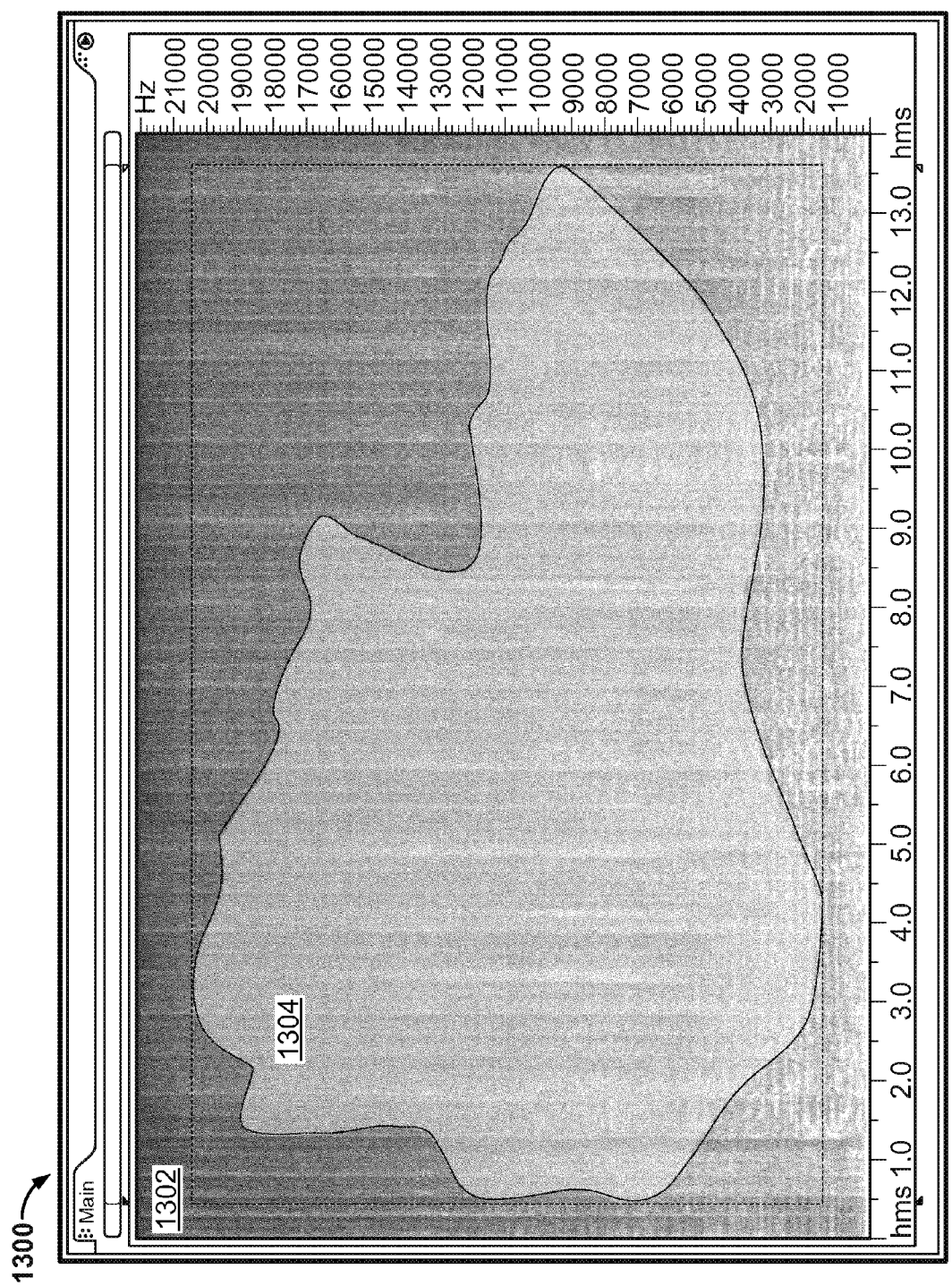
FIG. 13 is an example display of an arbitrary region demarcated in a frequency spectrogram.

FIG. 13 is an example display 1300 of an arbitrary region 1304 for a frequency spectrogram 1302. The arbitrary region 1304 can be drawn, for example, using a freehand tool such as a lasso tool that allows a user to draw an arbitrary region 1304. Once the arbitrary region 1304 has been drawn, the user can import an image that conforms to the arbitrary region 1304.

Figure 14:
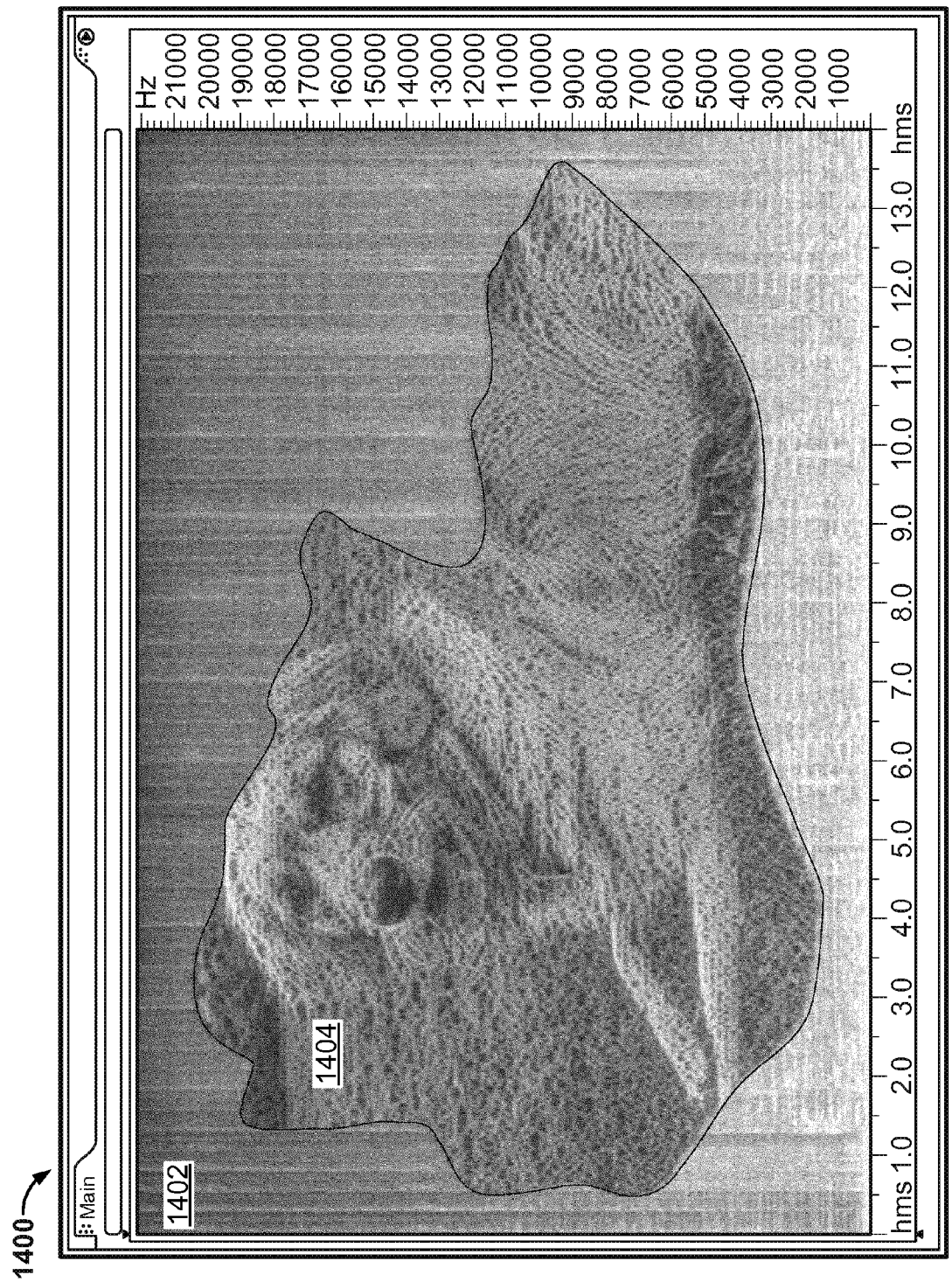
FIG. 14 is an example display of an image imported onto an arbitrary region of a frequency spectrogram.

FIG. 14 is an example display 1400 of an image 1404 imported onto a frequency spectrogram 1402. For example, the image 1404 can be imported into an arbitrary region (e.g., arbitrary region 1304 of FIG. 13) generated by the user. As shown in FIG. 14, the image 1404 conforms to the boundary of the arbitrary region defined for importing the image 1404. Once the image has been imported, the user can apply various effects using the image as a mask or convert the image into audio data, as described above.

In some implementations, the user generates an image from the visual representation of audio data. For example, the user can create an image that corresponds to a particular visual representation of the audio data, e.g., as a frequency spectrogram, pan position display, or phase display. The generated image can be exported to another application or saved as an image file. The generated image can then be edited, for example, using a graphics application.

Figure 15:
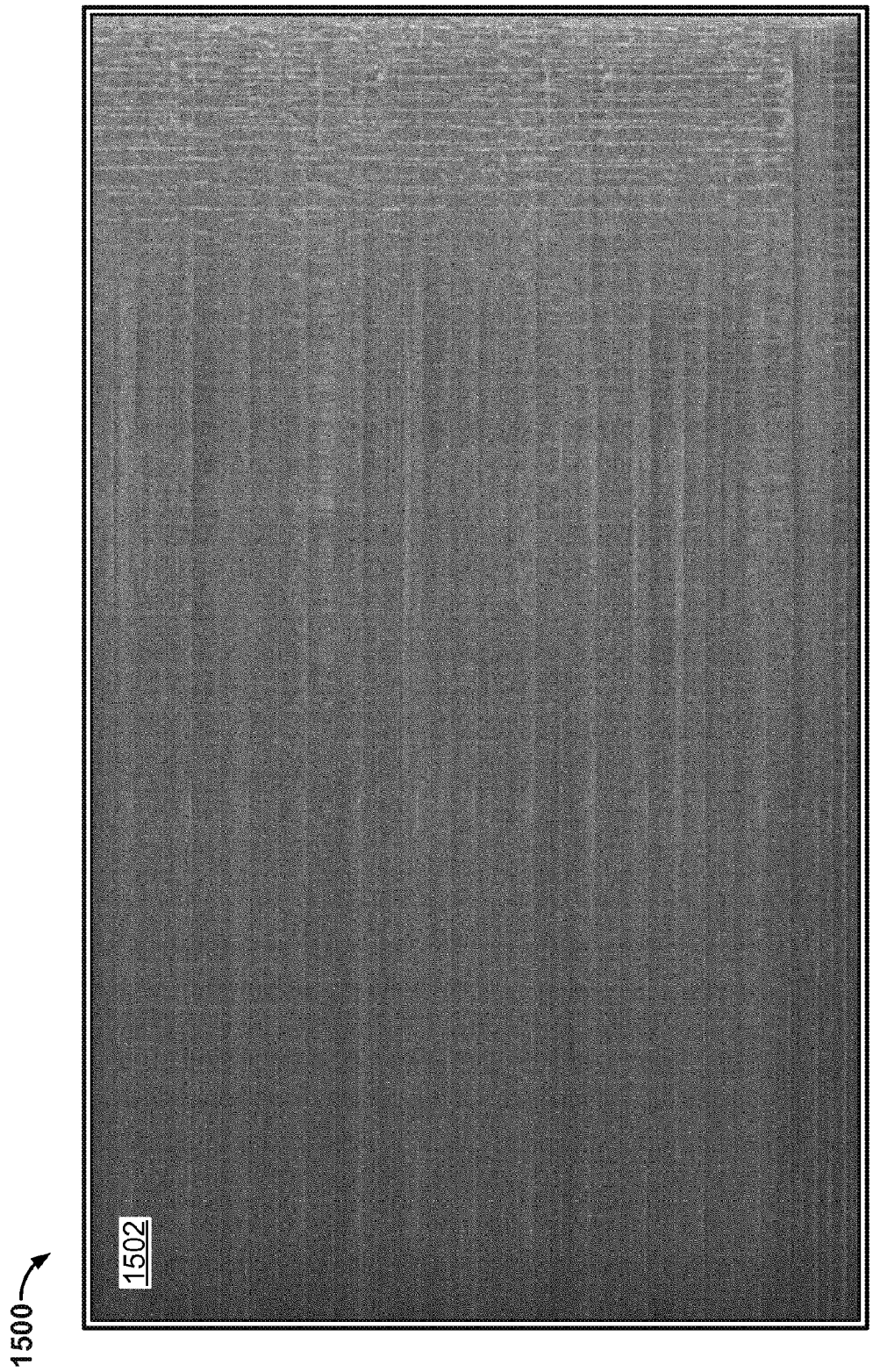
FIG. 15 is an example image generated from audio data.

FIG. 15 is an example image 1500 generated from audio data. For example, the image 1500 can correspond to the visual representation of the audio data, e.g., as a frequency spectrogram. In some implementations, the image 1500 can be imported back into the system as audio data without loss of information. In some implementations, the image 1500 can be edited in a graphics application to form an edited image. The edited image is imported to the system and displayed as audio data. The conversion into an image can result in a loss of information regarding audio parameters, especially if the image is edited, for example, using a graphics editing system. Consequently, the system can convert the imported image back into audio data, for example, as described above.

Figure 16:
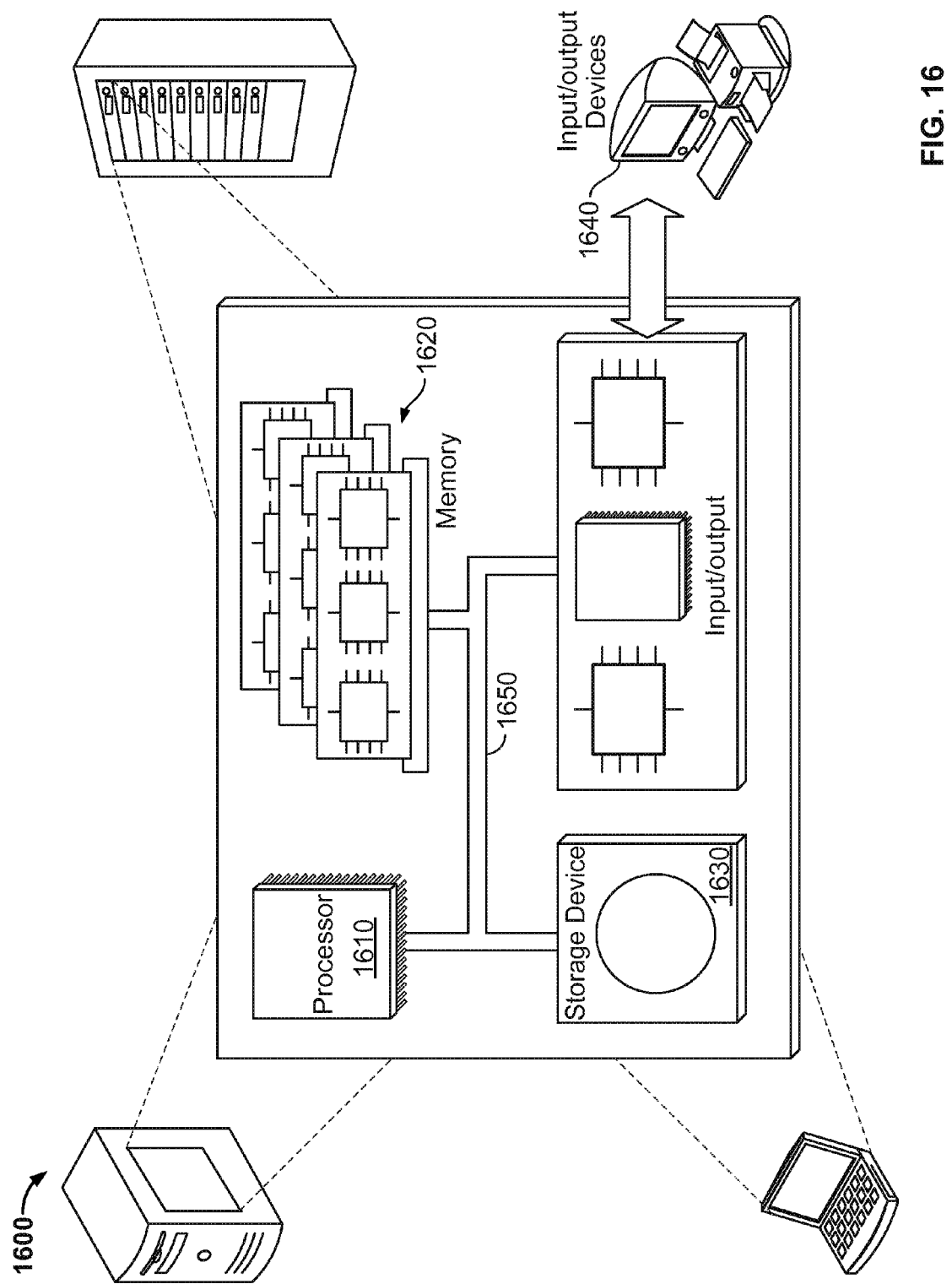
FIG. 16 is a block diagram of an example system for editing audio data.

An example of a computer is shown in FIG. 16, which shows a block diagram of a programmable processing system (system) 1600 suitable for implementing apparatus or performing methods of various aspects of the subject matter described in this specification. The system 1600 can include a processor 1610, a memory 1620, a storage device 1630, and input/output devices 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 is a computer readable medium such as volatile or non volatile that stores information within the system 1600. The memory 1620 could store data structures representing history trees and reduced history trees for complex solids, for example. The storage device 1630 is capable of providing persistent storage for the system 1600. The storage device 1630 may be a floppy disk device, a hard disk device, an optical disk device, or a tape device, or other suitable persistent storage means. The input/output device 1640 provides input/output operations for the system 1600. In one implementation, the input/output device 1640 includes a keyboard and/or pointing device. In another implementation, the input/output device 1640 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   displaying, on a display device, a visual representation of digital audio data;
   receiving an image;
   positioning the image as overlapping a portion of the displayed visual representation of the audio data; and
   editing the audio data corresponding to the portion of the displayed visual representation of the audio data overlapped by the image to form edited audio data, the editing including modifying the audio data by applying a variable editing effect according to the image content.

2. The method of claim 1, where applying the variable editing effect comprises:
   identifying a plurality of colors associated with the image; and
   assigning a magnitude of the editing effect to apply to each identified color.

3. The method of claim 2, where the colors are grayscale colors and the assigned magnitude is determined using grayscale color values from white to black.

4. The method of claim 1, where the editing effect is an attenuation effect.

5. The method of claim 1, further comprising:
replacing the portion of the audio data overlapped by the image with edited audio data.

6. The method of claim 1, where the visual representation is a frequency spectrogram, the method further comprising:
dividing the image into a grid including a plurality grid boxes with respect to specified time intervals and frequency bands; and
determining a color value for each grid box.

7. The method of claim 1, where applying a variable editing effect according to the image content includes:
determining a minimum and maximum amount of the editing effect to apply to the audio data; and
determining an amount of the editing effect to apply to a particular point of audio data as a function of the minimum and maximum amounts and the color value associated with the particular point of audio data.

8. The method of claim 1, further comprising:
storing the edited audio data.

9. A computer-implemented method comprising:
receiving, by a computer system, a non-audio image;
converting the non-audio image into a display of a visual representation of audio data using a specified conversion mode; and
storing audio data corresponding to the displayed visual representation of audio data.

10. The method of claim 9, further comprising:
receiving digital audio data;
displaying a visual representation of the digital audio data; and
positioning the received non-audio image as overlapping a portion of the visual representation of the audio data.

11. The method of claim 9, where converting the non-audio image includes associating particular image contents with corresponding frequencies.

12. The method of claim 11, where the frequencies include a specified number of pure tones.

13. The method of claim 11, where the frequencies include random noise tones that fluctuate over time relative to corresponding pure tones.

14. The method of claim 9, where converting the non-audio image includes using the image color to identify intensity values for the converted image.

15. The method of claim 9, where converting the non-audio image includes tracking image content to identify frequency values.

16. A computer program product, encoded on a non-transitory computer-readable medium, operable to cause data processing apparatus to perform operations comprising:
displaying, on a display device, a visual representation of digital audio data;
receiving an image;
positioning the image as overlapping a portion of the displayed visual representation of the audio data; and
editing the audio data corresponding to the portion of the displayed audio data overlapped by the image to form edited audio data, the editing including modifying the audio data by applying a variable editing effect according to the mask image content.

17. The computer program product of claim 16, where applying the variable editing effect comprises:
identifying a plurality of colors associated with the image; and
assigning a magnitude of the editing effect to apply to each identified color.

18. The computer program product of claim 17, where the colors are grayscale colors and the assigned magnitude is determined using grayscale color values from white to black.

19. The computer program product of claim 16, where the editing effect is an attenuation effect.

20. The computer program product of claim 16, the operations further comprising:
replacing the portion of the audio data overlapped by the image with edited audio data.

21. The computer program product of claim 16, where the visual representation is a frequency spectrogram and the operations further comprising:
dividing the image into a grid including a plurality grid boxes with respect to specified time intervals and frequency bands; and
determining a color value for each grid box.

22. The computer program product of claim 16, where applying a variable editing effect according to the image content includes:
determining a minimum and maximum amount of the editing effect to apply to the audio data; and
determining an amount of the editing effect to apply to a particular point of audio data as a function of the minimum and maximum amounts and the color value associated with the particular point of audio data.

23. The computer program product of claim 16, the operations further comprising:
storing the edited audio data.

24. A computer program product, encoded on a non-transitory computer-readable medium, operable to cause data processing apparatus to perform operations comprising:
receiving a non-audio image;
converting the non-audio image into a display of a visual representation of audio data using a specified conversion mode; and
storing audio data corresponding to the displayed visual representation of audio data.

25. The computer program product of claim 24, further comprising:
receiving digital audio data;
displaying a visual representation of the digital audio data; and
positioning the received non-audio image as overlapping a portion of the visual representation of the audio data.

26. The computer program product of claim 24, where converting the non-audio image includes associating particular image contents with corresponding frequencies.

27. The computer program product of claim 26, where the frequencies include a specified number of pure tones.

28. The computer program product of claim 26, where the frequencies include random noise tones that fluctuate over time relative to corresponding pure tones.

29. The computer program product of claim 24, where converting the non-audio image includes using the image color to identify intensity values for the converted image.

30. The computer program product of claim 24, where converting the non-audio image includes tracking image content to identify frequency values.

31. A system comprising:
a user interface device; and
one or more computers operable to interact with the user interface device and to perform operations including:
displaying, on the user interface device, a visual representation of digital audio data;
receiving an image;
positioning the image as overlapping a portion of the displayed visual representation of the audio data; and editing the audio data corresponding to the portion of the displayed audio data overlapped by the image to form edited audio data, the editing including modifying the audio data by applying a variable editing effect according to the mask image content.

32. The system of claim 31, where applying the variable editing effect comprises:
   identifying a plurality of colors associated with the image; and
   assigning a magnitude of the editing effect to apply to each identified color.

33. The system of claim 32, where the colors are grayscale colors and the assigned magnitude is determined using grayscale color values from white to black.

34. The system of claim 31, where the editing effect is an attenuation effect.

35. The system of claim 31, the operations further comprising:
   replacing the portion of the audio data overlapped by the image with edited audio data.

36. The system of claim 31, where the visual representation is a frequency spectrogram, the operations further comprising:
   dividing the image into a grid including a plurality grid boxes with respect to specified time intervals and frequency bands; and
   determining a color value for each grid box.

37. The system of claim 31, where applying a variable editing effect according to the image content includes:
   determining a minimum and maximum amount of the editing effect to apply to the audio data; and
   determining an amount of the editing effect to apply to a particular point of audio data as a function of the minimum and maximum amounts and the color value associated with the particular point of audio data.

38. The system of claim 31, the operations further comprising:
   storing the edited audio data.

39. A system comprising:
   a user interface device; and
   one or more computers operable to interact with the user interface device and to perform operations including:
      receiving a non-audio image;
      converting the non-audio image into a display of a visual representation of audio data using a specified conversion mode; and
      storing audio data corresponding to the displayed visual representation of audio data.

40. The system of claim 39, the operations further comprising:
   receiving digital audio data;
   displaying a visual representation of the digital audio data; and
   positioning the received non-audio image as overlapping a portion of the visual representation of the audio data.

41. The system of claim 39, where converting the non-audio image includes associating particular image contents with corresponding frequencies.

42. The system of claim 41, where the frequencies include a specified number of pure tones.

43. The system of claim 41, where the frequencies include random noise tones that fluctuate over time relative to corresponding pure tones.

44. The system of claim 39, where converting the non-audio image includes using the image color to identify intensity values for the converted image.

45. The system of claim 39, where converting the non-audio image includes tracking image content to identify frequency values.

* * * * *